United States Patent [19]

Ursel

[11] 3,908,244

[45] Sept. 30, 1975

[54] RELEASABLE FASTENING BETWEEN WIPER BLADE AND WIPER ARM IN A WINDSHIELD WIPER

[75] Inventor: Eckhard Ursel, Buhl, Germany

[73] Assignee: Robert Bosch G.m.b.H., Gerlingen-Schillerhoehe, Germany

[22] Filed: Feb. 8, 1974

[21] Appl. No.: 440,780

[30] Foreign Application Priority Data
Mar. 7, 1973  Germany............................ 2311143

[52] U.S. Cl............................ 24/243 R; 15/250.32
[51] Int. Cl.²........................................... B60S 1/32
[58] Field of Search....... 15/250.31, 250.32, 250.33, 15/250.35, 250.36; 24/243 SP, 255 SP, 243 R

[56] References Cited
UNITED STATES PATENTS

| 2,031,297 | 2/1936 | Anderson......................... 15/250.32 |
| 2,170,939 | 8/1939 | Christen.......................... 15/250.32 |
| 2,265,266 | 12/1941 | Cote............................ 15/250.31 X |
| 2,751,620 | 6/1956 | Ehrlich............................ 15/250.32 |
| 3,453,680 | 7/1969 | Charlton......................... 15/250.33 |
| 3,757,377 | 9/1973 | Hayhurst........................ 15/250.32 |

FOREIGN PATENTS OR APPLICATIONS

| 1,023,024 | 12/1952 | France............................. 15/250.33 |
| 18,189 | 12/1955 | Germany....................... 15/250.31 |
| 1,028,003 | 4/1958 | Germany....................... 15/250.31 |

*Primary Examiner*—Donald A. Griffin
*Attorney, Agent, or Firm*—William R. Woodward

[57] ABSTRACT

A spring clip is mounted astride a stiff guiding piece having cut-outs to accommodate the projections which complete the spring catch, so as to take up the lateral forces exerted by the wiper blade which would otherwise tend to spread the clip and cause undesired release of the attachment. If it is not necessary to allow for rotation of the wiper blade relative to the wiper arm, as is required for so-called steered wipers, the guiding piece may be provided by the end portion of the wiper arm, which is for that purpose made to have a U-shaped cross section.

20 Claims, 6 Drawing Figures

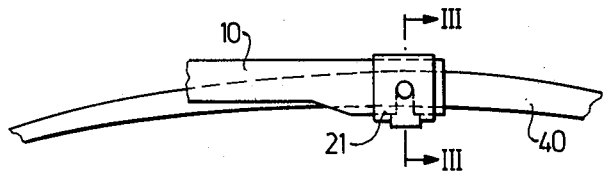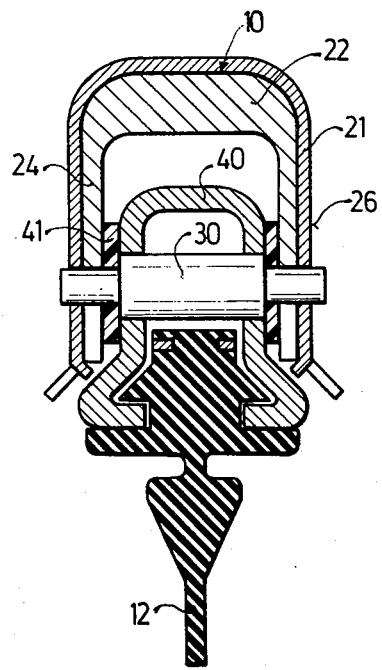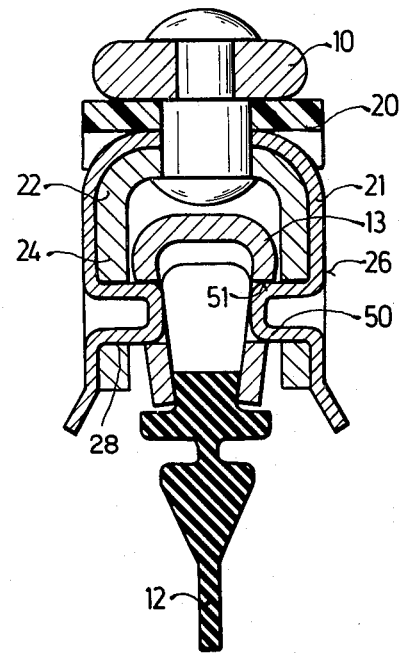

RELEASABLE FASTENING BETWEEN WIPER BLADE AND WIPER ARM IN A WINDSHIELD WIPER

This invention relates to a releasable fastening between the wiper blade and the wiper arm of a windshield wiper designed to be more firm in operation without sacrifice of ease of detachment. More particularly, the invention relates to fastenings in which one member has a spring clip on the jaws of which the other member is pivotally mounted.

In a known fastening of this kind a pin is fastened to the wiper blade that sticks out on both sides of the blade, thus providing projections to catch into corresponding holes in a substantially U-shaped spring clip. The clip is rigidly fixed to the wiper arm. This known fastening between the wiper arm and the wiper blade is very quickly releasable, but has the disadvantage that it can also easily release accidentally. That is because the wiper blade is pressed in operation against the side walls or jaws of the spring clip and especially when the forces are large, i.e., in the case of a rough or dirty windshield, presses so strongly sideways that the projection on the other side of the wiper blade pops out of the hole in the clip. Because of the resilience of the jaws of the clip, moreover, the wiper blade can turn considerably about an axis perpendicular to the windshield as well as about an axis in the longitudinal direction of the wiper blade as just described, so that trouble-free operation of the windshield wiper is not obtained.

It is accordingly an object of the invention to provide a fastening between wiper blade and wiper arm of a windshield wiper that is quickly and simply releasable manually and at the same time will not release by itself during operation and, furthermore, is so constituted that the wiper blade is guided in its path without complications.

SUBJECT MATTER OF THE PRESENT INVENTION

Briefly, the spring clip is mounted astride a guiding piece, which may also be regarded as a shield piece, likewise U-shaped, having cut-outs in its side walls through which the projections of the catch may extend. The guiding piece unyieldingly takes the strain tending to distort the fastening, so that the effectiveness of the catch provided by the spring clip to maintain the connection between wiper blade and wiper arm is unimpaired under all conditions of operation. The invention is applicable both to attachments of the type already mentioned in which the projections are on the wiper blade and the holes in the clip and also to a converse arrangement in which the projections are on the clip and engage in holes in the wiper blade. The concept is also applicable both for structures where the clip is on the wiper arm and the wiper blade is inserted into it and for structures in which the clip is on the wiper blade and the arm is inserted into it.

In one embodiment the guiding piece and the clip are permanently fastened to the wiper arm and the cut-outs in the sides of the guiding piece are opened to the edges of the guiding piece. Projecting studs are provided on the wiper blade that during insertion of the wiper blade are guided by the side walls of the guiding piece, until they nest in the coaxial holes provided in the spring clip.

In a fastening so constituted the distorting forces are taken up by the side walls of the guiding piece, so that they cannot bend the side walls of the spring clip. If the spacing between the side walls of the guiding piece fairly closely fit the width of the wiper blade, the wiper blade cannot swing relative to the guiding piece on an axis perpendicular to the windshield.

The projecting studs on the wiper blade are preferably provided by a pin passing through the blade of a diameter closely fitting the diameter of the holes in the spring clip and also the width of the cut-outs in the side walls of the guiding piece. In that case, the wiper blade cannot swing within the guiding piece about a longitudinal axis. In such a construction, the force of application against the surface to be wiped is transmitted through the spring clip from the wiper arm to the wiper blade. It is also possible, however, to make the diameter of the holes in the clip larger, so that this force is transmitted through the guiding piece to the wiper blade either by contact with the ends of the pin or by contact between the crown of the guiding piece and the back surface of the blade, so that in either case the spring clip is relieved.

An improved fastening according to the invention is provided by the insertion of a spacer, preferably made of a synthetic resin plastic, spacing the spring clip and the guiding piece away from the wiper arm. The spacer in this case has projections engaging the side walls of the guiding piece on both sides that prevent the spacer from turning relative to the guiding piece. The length (in the longitudinal direction of the wiper arm) of the spring clip is preferably less than the corresponding dimension of the guiding piece, in which case the projections of the spacer have cut-outs through which the spring clip passes. Spacer, clip and guiding piece are then held against any movement relative to each other.

In another embodiment the guiding piece is an integral part of the wiper arm, the arm having an end portion of U-shaped cross section. The spring clip is snapped over this end of the wiper arm and releasably held in place by tangs on its overhanging ends. This arrangement saves the manufacture of a separate guiding piece. Such a construction is only feasible, however, if the wiper blade is not in operation required to turn about an axis perpendicular to the windshield.

In a fastening of the type just described, the projections may be provided on the clip to fit in holes in the wiper blade and the cut-outs in the end of the arm acting as a guiding piece may be round holes through which the projections of the clip protrude into the inside space.

The invention will be further described by way of examples by reference to the accompanying drawings in which:

FIG. 3 is a side view of another embodiment of a fastening between wiper arm and wiper blade according to the invention;

FIG. 4 is an enlarged cross section along the line III—III of FIG. 3;

FIG. 5 is a cross section of a third embodiment of a fastening according to the invention similar to FIGS. 2 and 4.

Figure 1:
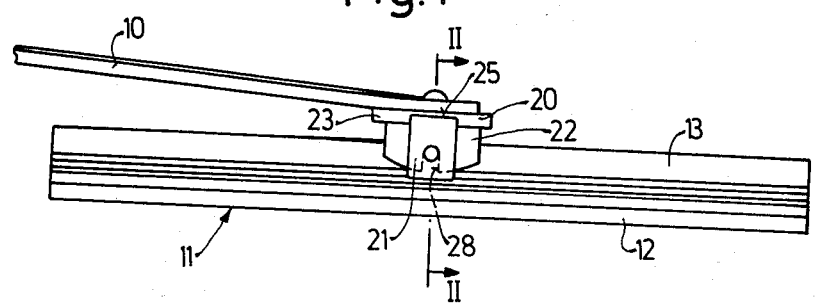
FIG. 1 is a side view of a wiper blade and the adjacent part of a wiper arm.

In the various Figures of the drawing the end of the wiper arm is designated 10. The wiper arm is fixed on a wiper drive shaft (not shown) in a known way. A wiper blade 11, comprising a rubber squeegee 12 and a stiffening channel 13 at the back of the blade, is hung on the wiper arm 10 so that it can swing with respect thereto.

A U-shaped spring clip 21 and a U-shaped guiding piece 22 as well as a spacer 20 made of a synthetic resin material, are mounted on the wiper arm 10 in a manner permitting rotation by means of a rivet 19.

The spacer 20, which spaces the clip and guide piece from the wiper arm, is made in the form of a plate with projections 23 at both of its longer edges which rest against the side walls 24 of the guiding piece 22. In their respective midportions these projections 23 each have a cut-out for a certain length in the middle that corresponds to the width of the spring clip 21. The projections 23 thus prevents the spring clip 21, the back 25 of which bears against the spacer 20 from rotating with respect to the spacer.

The spring clip 21, the width of which is less than the corresponding dimension of the guiding piece 22 is fitted astride the guiding piece so that the jaws 26 of the clip 21 rest against the side walls 24 of the guiding piece 22. The jaws 26, however, overhang the side walls 24 of the guiding piece 22 and are bent outwards at 27, so as to provide a hand hold for releasing the connection between wiper arm and wiper blade. Somewhat U-shaped cut-outs 28 are provided in the side walls 24 of the guiding piece 22, opening out to the respective outer edges of the guiding piece 22. The jaws 26 of the spring clip 21 have coaxial holes 29. The diameter of these holes and the width of the cut-Outs 28 correspond to the diameter of a pin 30 that passes through the wiper blade 11. This pin 30 is knurled in its middle region and thereby fastened rigidly to the channel 13. In the modified embodiment of FIG. 2 the diameter of the holes 29 is slightly greater than the diameter of the pin 30, so that the wiper blade, at least through the pin 30, bears directly on the guiding piece 22.

The wiper blade can be easily attached to the wiper arm and detached from it. For attachment the wiper blade is simply inserted between the open ends of the side walls 24 of the guiding piece 22, so that the projection forming pin 30 fits into the cut-outs 28 of the side walls 24. By a light pressure in the direction of the arrow A in FIG. 2 exerted on the wiper blade the jaws 26 of the spring clip 21 are spread apart as the wiper blade is inserted, until the ends of the pin 30 nest in the holes 29, locking the fastening. The wiper blade is then pivotally held between the jaws of the clip and between the side walls 24 of the guiding piece 22. To release the fastening it is necessary only to spread the two jaws 26 of the clip 21 apart, so that the wiper blade can be detached from the arm by a pull in the direction opposite to that of the arrow A.

In the embodiment shown in FIGS. 3 and 4 the outer end of the wiper arm 10 is made to have a U-shaped cross section and thus integrally forms the guide piece 22. The spring clip 21 is fitted astride this end of the wiper arm, with its jaws overhanging the edges of the U-shaped portion. The extremities of the jaws have portions bent inward and portions bent outward, so that the spring clip 21 can be snapped into position and held there on the end portion of the wiper arm serving as guide piece and can also readily be spread apart to release the wiper blade. In this embodiment the wiper blade 11, instead of having a simple channel backing, has a claw type metal back 40 that carries the pin 30. The width of the claw type back 40 is less than the clearance between the side walls of the guide piece 22, so that the back piece 40 does not rest against the side walls. To provide this spacing the ends of the pin 30 are turned down and respectively carry two spacer washers 41 made of synthetic resin material, the outer edges of which rest against the side walls 24 of the guiding piece 22. This arrangement differs from the embodiment of FIGS. 1 and 2, in which the width of the channel 13 rather closely fitted the spacing between the sides of the guiding piece 22. In the embodiment of FIGS. 3 and 4 the wiper blade is driven through the spacer washers 41 and the turned down pin 30. In the case of this embodiment, accordingly, the wiper blade may readily, as well as securely, swing while pivoting on the axis of the pin 30, because only small friction is to be expected there.

The embodiment shown in FIG. 5 is distinguished from the previously described embodiments mainly in that the locking projections, which up to now have been described as formed by the pin 30, are in this case provided on the spring clip 21. These projections 50 can be formed by stamping the jaws 26 of the spring clip 21 at a suitable stage of manufacture. They protrude through the side walls 24 of the guiding piece 22 and into holes 51 in the sides of the channel 13. In this case there is no need for the cut-outs 28 in the guiding piece 22 to be open to the bottom edges of the guiding piece and these cut-outs may accordingly be round holes, as shown in FIG. 5.

Figure 2:
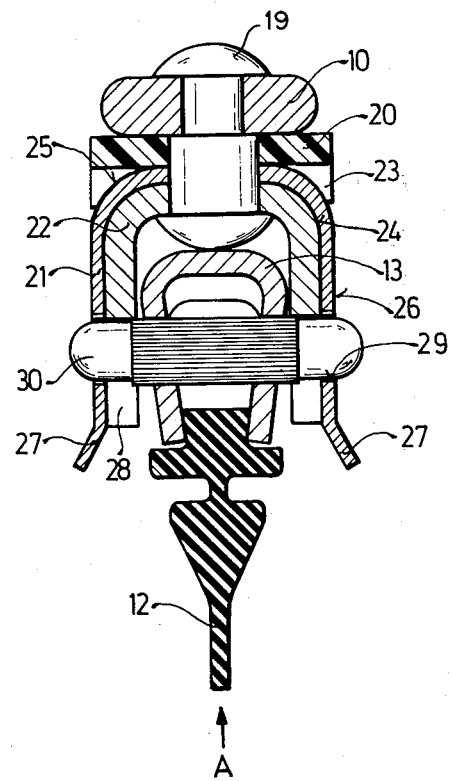
FIG. 2 is an enlarged cross section along the line II—II of FIG. 1.
Figure 6:
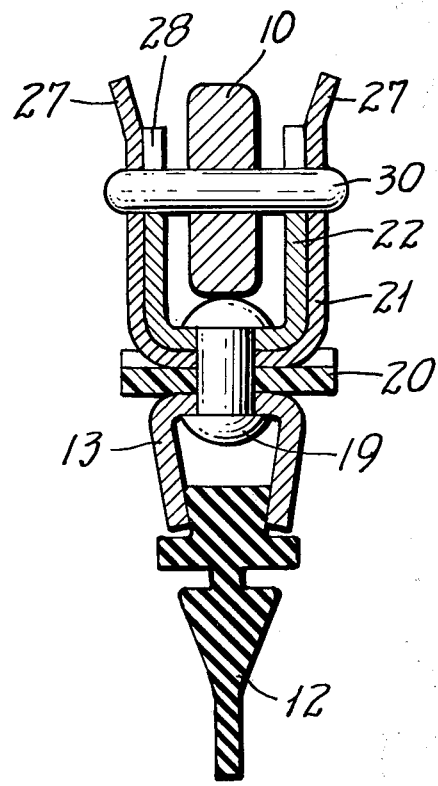
FIG. 6 is a cross section of a fastening in which the guiding piece and clip are fastened to the wiper blade instead of to the wiper arm.

FIG. 6 shows a form of fastening similar to FIG. 2 in which the clip and the guiding piece are fastened to the wiper blade and the pin 30 is mounted on the wiper arm.

In all four embodiments described above the spring clip 21 is fitted closely astride the guiding piece 22 that is made stiff and takes up the forces in the direction of the axis of the pin 30, or its equivalent, that the wiper blade exerts. These forces can therefore not be transmitted to the spring clip 21, so that the fastening between the wiper blade 11 and the wiper arm 10 cannot be accidentally released. The guiding piece 22 moreover assures that the wiper blade will not turn reltive to the guiding piece 22 about an axis perpendicular to that of the pin 30, hence not about an axis perpendicular to the windshield. Even a swinging movement about an axis in the longitudinal direction of the wiper blade is to a large extent prevented by the guiding piece 22.

In the embodiments of FIGS. 1, 2, 5 and 6 the wiper blade is rotatably hung on the wiper arm. Such a construction is necessary in the so-called steered wipers. In such windshield wipers the angular position of the wiper blade relative to the wiper arm must change during the wiper cycle.

In the case of the embodiment shown in FIGS. 3 and 4 the wiper blade is rigidly fixed to the wiper arm, except possibly for a little play about the axis of the pin 30, a result that can be obtained in the other embodiments by the use of two rivets instead of one to hold the clip and guiding piece.

Although the invention has been described with reference to particular embodiments, it is to be understood that modifications and variations may be made within the inventive concept. For example, features of some of the embodiments may be used instead of features shown on other embodiments. More particularly, an arrangement in which the spring clip and the guiding piece are permanently fastened to the wiper blade, as in FIG. 6, instead of using a pin 30 passing through the wiper arm forming projections thereon engaging it into holes in the spring clip, the spring clip may have projections passing through the guiding piece and locking into holes in the wiper arm in a manner shown in FIG. 5.

I claim.

1. A releasable fastening between two members, one of which is the wiper arm and the other the wiper blade of a windshield wiper, comprising:

a U-shaped spring clip affixed to a first one of said members, in the jaws of which the second of said members is insertable and, after insertion, capable of being pivotally mounted by the nesting of cylindrical projections into holes, said spring clip carrying either the holes or the projections and the member insertable therein carrying the projections, in the first case, and the holes, in the second case, and a guiding piece (22), also of U-shaped cross-section, likewise affixed to said first one of said members and into which the second of said members is likewise insertable, said guiding piece being capable of transmitting force between said members independently of said clip and having side walls (24) having cut-outs (28) of such size as to accept the aforesaid projections (30,50), said spring clip (21) being closely fitted over said guiding piece (22), said insertable second member being held by the aforesaid nesting, whereby it is nondestructively removable from the first member.

2. A releasable fastening as defined in claim 1 in which said guiding piece (22) and said spring clip (21) are unreleasably fastened to said wiper arm (10).

3. A releasable fastening as defined in claim 2 in which a spacer (20) is provided between said spring clip (21) and guide piece (22), on one side of said spacer, and said wiper arm (10) on the other side of said spacer.

4. A releasable fastening as defined in claim 3 in which said spacer is made of a synthetic resin material.

5. A releasable fastening between the wiper arm and the wiper blade of a windshield wiper, comprising:

a U-shaped spring clip (21) unreleasably fastened to said wiper arm (10) in the jaws of which said wiper blade is insertable and, after insertion, capable of being pivotally mounted by the nesting of cylindrical projections into holes, said spring clip carrying either the holes or the projections and said wiper blade carrying the projections, in the first case, and the holes, in the second case;

a guiding piece (22), also of U-shaped cross-section and likewise unreleasably fastened to said wiper arm, with side walls (24) having cut-outs (38) of such size as to accept the aforesaid projections (30,50), said spring clip (21) being closely fitted over said guiding piece (22), and a spacer (20) between said spring clip (21) and said wiper arm (10), said spacer being provided with projections on opposite sides engaging the side walls (25) of said guiding piece (22).

6. A releasable fastening as defined in claim 5 in which the width of said spring clip (21) is less than the corresponding dimension of said guiding piece (22) and that said projections (23) of said spacer (20) in each case have a cut-out through which said spring clip (21) passes.

7. A releasable fastening as defined in claim 2 in which said guiding piece (22) and said spring clip (21) are rotatably fastened to said wiper arm (10).

8. A releasable fastening as defined in claim 2 in which said guiding piece (22) and said spring clip (21) are rigidly affixed to said wiper arm (10).

9. A releasable fastening as defined in claim 1 in which said projections (30) are provided on said wiper blade (11), and said holes (29) are provided on a corresponding axis in said spring clip (21), and said cut-outs (28) in said guiding piece (22) are slots open at the edges thereof and aligned with said holes, so that upon insertion of said wiper blade (11) said projections may be guided to lock in said holes.

10. A releasable fastening as defined in claim 9 in which the diameter of said projections (30) corresponds to the diameter of said holes (29) in said spring clip (21) and to the width of said cut-outs (28) in said side walls (24) of said guiding piece (22).

11. A releasable fastening as defined in claim 1 in which said cut-outs (28) in the side walls (24) of said guiding piece (22) are circular and in which said projections (50) are provided on said spring clip (21) projecting inward on a common axis in alignment with said cut-outs (28), and in which, further, said holes (51) are provided on said wiper blade (11).

12. A releasable fastening as defined in claim 11 in which the diameter of said projections (50) corresponds to the diameter of said cut-outs (28) in the side walls (24) of said guiding piece (22) and to the diameter of the holes (51) in said wiper blade (11).

13. A releasable fastening as defined in claim 1 in which the width of said wiper blade (11) is substantially the same as the spacing between said side walls (24) of said guiding piece (22).

14. A releasable fastening as defined in claim 1 in which the jaws (26) of said spring clip (21) overhang the side walls (24) of said guiding piece (22) and are bent over.

15. A releasable fastening as defined in claim 1 in which said guiding piece and said spring clip (21) are affixed to said wiper blade (11).

16. A windshield wiper arm having a releasable fastening between it and a wiper blade, comprising:

a wiper arm (10) having a blade-guiding portion at its outer end having a U-shaped cross-section, and a U-shaped spring clip closely fitted over said blade-guiding portion of said wiper arm and affixed to said wiper arm, so that the wiper blade is insertable in the jaws of both said guiding portion and the spring clip fitted thereover, said blade being, after insertion, capable of being pivotally mounted by the nesting of cylindrical projections into holes, said spring clip carrying either the holes or the projections and the blade carrying the projections, in the first case, and the holes, in the second case, and said guiding portion of said wiper arm having side walls (24) with cut-outs (38) of such size as to accept the aforesaid projections (30,50).

17. A releasable fastening as defined in claim 16 in which said spring clip (21) is held on said wiper arm (10) by a catch engagement (FIG. 4).

18. A releasable fastening as defined in claim 17 in which said projections are provided on said wiper blade (11) by a pin (30) passing through said wiper blade.

19. A releasable fastening as defined in claim 18 in which said pin (30) is knurled over a portion of its length and is rigidly affixed to said wiper blade (11).

20. A releasable fastening as defined in claim 18 in which the diameter of said holes (29) in said spring clip (21) is greater than the diameter of said pin (30), so that in the direction of the force supplying said wiper blade against the surface to be wiped, said wiper blade bears directly on said guiding piece (22).

* * * * *